United States Patent [19]
Tamm

[11] Patent Number: 5,214,247
[45] Date of Patent: May 25, 1993

[54] CABLE CONNECTOR

[75] Inventor: Carl R. Tamm, Jonesboro, Tenn.

[73] Assignee: Buchanan Construction Products, Inc., Hackettstown, N.J.

[21] Appl. No.: 739,221

[22] Filed: Aug. 1, 1991

[51] Int. Cl.[5] .............................................. H02G 3/18
[52] U.S. Cl. .................................. 174/65 R; 285/194
[58] Field of Search ............... 174/65 R; 285/46, 162, 285/194, 158, 159, 205

[56] References Cited

U.S. PATENT DOCUMENTS

| | | |
|---|---|---|
| 2,527,227 | 10/1950 | Namet . |
| 2,555,292 | 5/1951 | Poupitch ............................ 285/194 |
| 2,864,161 | 12/1958 | Curtiss . |
| 3,139,768 | 7/1964 | Biesecker ........................... 285/205 |

Primary Examiner—Harold Broome
Attorney, Agent, or Firm—Kinzer, Plyer, Dorn, McEachran & Jambor

[57] ABSTRACT

A cable connector for supporting and retaining electrical conductors or cables in an opening of an electrical junction box or the like. The connector is comprised of a hollow tubular body with a saddle-shaped compound concave flange at one end and longitudinally extending folds or corrugations in opposing sides of the tubular body at the other end. The connector is formed of a readily deformable metal so as to allow the hollow tubular body to be compressed around a cable passed axially through it. The two radii dimensions of the compound concave flange are chosen such that upon compression of the corrugated section the flange is deformed into a flat, planar shape which abuts against the inside wall of the electrical box. Compression of the corrugated end also results in the centermost corrugation being forced outward so as to form an opposing abutment to the flange. Inwardly projecting dimples or elongated cleats on the opposing planar surfaces of the corrugated end enhance the frictional engagement of the connector with the cable.

10 Claims, 3 Drawing Sheets

CABLE CONNECTOR

BACKGROUND OF THE INVENTION

This invention relates in general to connectors for the support and retention of electrical conductors or cables in openings of electrical junction boxes or the like. It has been known from the prior art to provide a metallic connector with a compressive, hollow tubular body at one end and an annular flange at the other end. The annular flange serves the purpose of engaging the wall of the electrical box while the tubular body projects through the opening. After an electrical conductor or cable is passed axially through the tubular body of the connector, the tubular body is deformed by applying compressive pressure on opposing sides of the tubular body section. Thus, in the same motion, the connector is compressed upon and engages the cable, and the sides of the connector are projected outwardly, securing the connector to the outlet box and providing mechanical retention of the cable to the outlet box.

A major disadvantage of the presently known connectors of the type described is that they do not provide adequate closure of the opening into which the connector is installed so as to prevent foreign objects from entering. The annular flange portion of said connectors comprises a substantially flat form and is positioned in a plane perpendicular to the axis of the tubular body section. When the tubular body section is compressed around the cable the flange is, by its inherent nature, deformed from a substantially flat form into a compound concave surface.

This deformation of the annular flange presents two problems. First, and already mentioned, the deformation dislocates the flange from its intended position, raising a great percentage of its contact area from the wall of the electrical box and providing access for foreign objects to enter between the wall of the box and the annular flange. Second, the deformed flange is supported by only two points of contact with the box wall along the edge of the once flat flange. When the connector is compressed, the flange curls inward towards the tubular body being compressed, resulting in only two outer points of contact with the electrical box wall. FIG. 10, which depicts an installed connector of the type generally described by the prior art, illustrates this problem. When the secured cable is subjected to tensile stress, these two points of contact tend to cause previously compressed areas of the tubular body to pull apart, disengaging the cable and causing failure of the connection.

For the purposes of comparing the operation of connector 10 of the present invention with the operation of connectors described in the prior art, consider a typical connector 40 of the type generally described by the prior art, a side view of which is presented in FIG. 9. Connector 40 is comprised of a tubular body 42 with a flat annular flange 44 at one end. As shown in FIG. 10 flange 44, when installed, will be deformed into a compound concave shape having only two points of contact, 43 and 45, with the electrical box wall. This presents the problems of inadequate closure of the opening and uneven distribution of tensile stress, eventually resulting in failure of the connector. The connector of the present invention overcomes these problems by incorporating a flange which has an initial compound concave shape, and which is deformed into a desired flat, planar shape upon compression of the tubular body.

A rear view of an installed connector 40 of the type generally described by the prior art is presented in FIG. 11. Inadequate closure results both from inadequate closure of tubular body 42 around cable 46 and from deformation of flange 44 into a compound concave shape. The resulting open spaces which may allow introduction of foreign objects into the connector and electrical box are shown in FIG. 11 at A and B. These defects are corrected by the connector of the present invention.

The present invention overcomes these shortcomings of the prior art by providing a connector with a compressible tubular body and having a saddle-shaped compound concave flange curving away from the tubular body as its retaining surface. When the tubular body is compressed, it will pull the curved flange towards the tubular body. After compression, the flange will have assumed a flat planar surface of engagement with the wall of the electrical box into which it is installed. There is closure of the opening adequate to prevent foreign objects from entering and any tensile stress is distributed over the entire abutting surface of the flange, eliminating the tendency of the connector to pull apart under strain.

SUMMARY OF THE INVENTION

The present invention relates to a mechanical connector which provides a connection between an insulated electrical cable and an electrical junction box or the like through an opening in the box.

A primary purpose of the invention is to provide a connector with a compressible tubular body and a compound concave flange at one end, such that when the tubular body is compressed the flange will be deformed into a flat, planar surface of engagement with the side of the electrical box.

A further purpose of the invention is to provide adequate closure of the knock-out opening to prevent introduction of foreign objects through or around the installed connector.

A further purpose of the invention is to provide an assembly such that when installed, tensile stress will not tend to disengage the connector from the cable.

A further purpose of the invention is to provide enhanced frictional engagement of the cable through the use of inwardly projecting dimples or elongated cleats, located on opposite sides of the tubular body, that engage the cable on opposite sides when compressed.

A further purpose of the invention is to provide a connector of the type previously described which may be easily installed using common tools such as pliers, and not requiring special crimping tools.

Other purposes will appear in the ensuing specifications, drawings and claims.

DETAILED DESCRIPTION OF THE INVENTION

Figure 1:
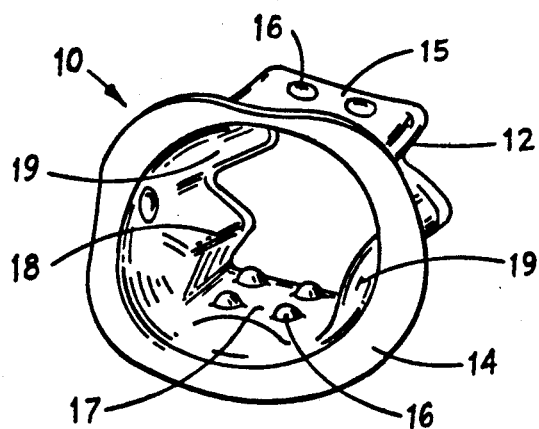
FIG. 1 is a perspective view showing an uninstalled cable connector of the type described by the present invention.

In the drawings, FIG. 1 is a perspective view of a cable connector 10 of the type described herein. The connector of FIG. 1 comprises a hollow tubular body 12 with a flange 14 at one end. Flange 14 has a saddle-shaped compound concave surface. Inwardly projecting dimples 16 are formed in the top surface 15 and bottom surface 17 of connector 10. Said dimples 16 are set in various geometric patterns and are not necessarily positioned directly opposite each other. In the embodiment of FIG. 1, four dimples 16 are arranged on bottom surface 17 of tubular body 12 in a square pattern and two dimples 16 are aligned on top surface 15 of tubular body 12, not directly opposite of the dimples on bottom surface 17.

Two opposing sides 19 of tubular body 12 are typically corrugated with a series of angular corrugations, shown in FIG. 1 at 18. Top surface 15 and bottom surface 17 have planar surfaces, with the exception of inwardly projecting dimples 16. In the preferred embodiment, connector 10 is composed of a readily deformable material, such as aluminum.

Figure 2:
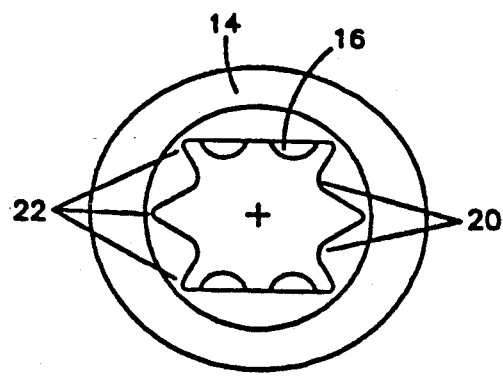
FIG. 2 is a front elevation view showing the flanged end of the uninstalled connector of the present invention.
Figure 3:
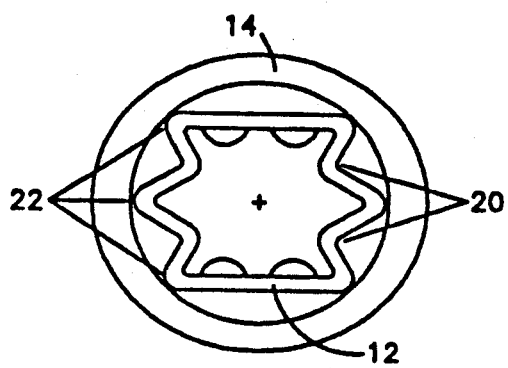
FIG. 3 is a rear elevation view showing the non-flanged end of the uninstalled connector of the present invention.
Figure 4:
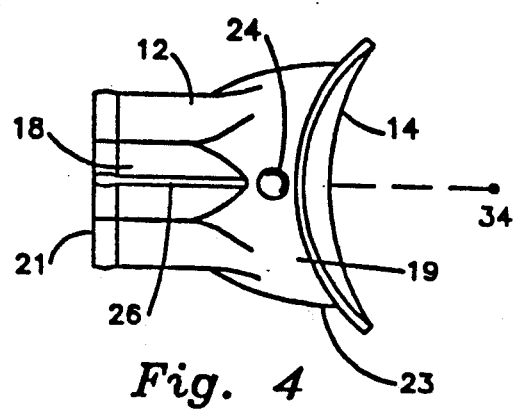
FIG. 4 is a side view of the uninstalled connector of the present invention showing one of the radius dimensions of the compound concave flange.

FIG. 2, which is a front view of the flanged end of connector 10, and FIG. 3, which is a rear view of tubular body 12 of connector 10, show more particularly the shape of angular corrugations 18 located along opposing sides 19 of tubular body 12. There are two inwardly projecting 90-degree angle corrugations, shown in FIGS. 2 and 3 at 20, and three outwardly projecting 60-degree angle corrugations, shown in FIGS. 2 and 3 at 22. It will be understood that the particular angles of the corrugations could be other than 90 and 60 and that these values are typical but they could be varied. As shown in FIG. 4, which is a side view of connector 10, angular corrugations 18 appear as three folds on opposing sides 19 of tubular body 12. They extend from the rear 21 of tubular body 12 approximately two-thirds of the way to flange 14, where they blend smoothly into the remainder of tubular body 12.

Also shown in FIG. 4 is one of two outwardly extending dimples 24. An identical dimple is opposite dimple 24 on opposing side 19 of tubular body 12. Dimples 24 are located on the edges of the outer ridges of the central 60-degree angle corrugations 26 of opposing sides 19 and immediately behind flange 14. Dimples 24 are located a suitable distance behind flange 14 to allow the thickness of a typical electrical box wall to fit between dimple 24 and flange 14.

At the front end 23 of tubular body 12 is flange 14, formed into a compound concave shape which may be described by two arcs swung in perpendicular planes on two distinct radii. The radius of the first arc originates at point 34 (FIG. 4) which is forward of the flange. It is swung in a vertical plane to define one arc comprising the compound concave shape of the flange. This arc is shown in FIG. 4.

Figure 5:
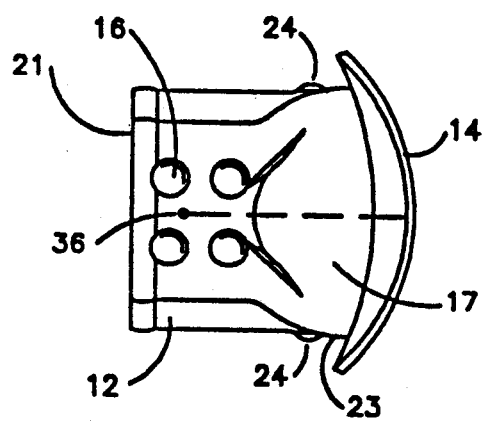
FIG. 5 is a bottom plan view of the uninstalled connector of the present invention showing the other radius dimension of the compound concave flange.
Figure 6:
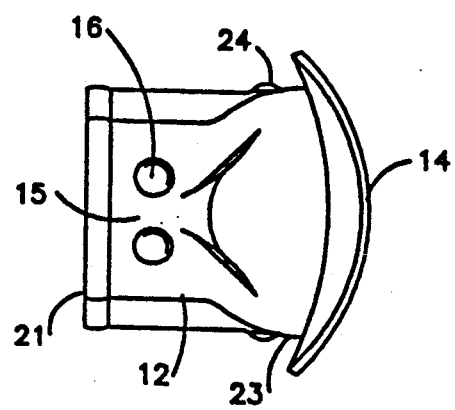
FIG. 6 is a top plan view of the uninstalled connector of the present invention.

The radius of the second arc originates at point 36 (FIG. 5) which is rearward from flange 14. The second radius is swung in a horizontal plane to define the arc, as seen in FIG. 5. The particular lengths of the radii are chosen so as to form a saddle-shaped compound concave surface which will, upon deformation of the tubular body, arrive at a flat shape in a single plane perpendicular to the longitudinal central axis of tubular body 12.

The term compound concave surface is used herein to describe the flange because the flange is concave in the vertical direction (as viewed from the front, see FIG. 4) and concave in the horizontal direction (as viewed from the rear, see FIG. 5). Alternately, the flange could be described as concave-convex, i.e., vertically concave and horizontally convex, when both directions are viewed from the front. Geometrically speaking, the flange shape resembles a segment of a torus whose conic section is a portion of a circle.

Figure 12:
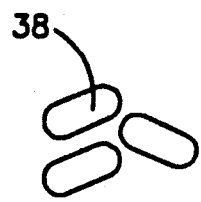
FIG. 12 is a typical geometric pattern of the cleats of an alternate embodiment of the present invention.
Figure 13:
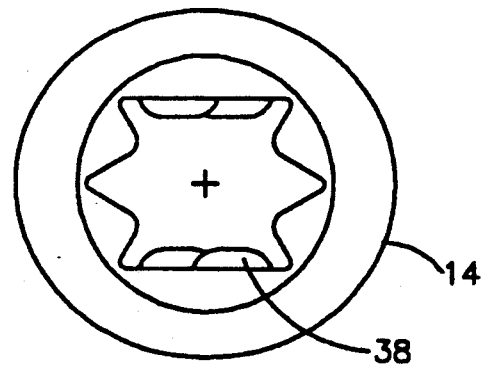
FIG. 13 is a front elevation view of an uninstalled connector of the type described by an alternate embodiment of the present invention.
Figure 14:
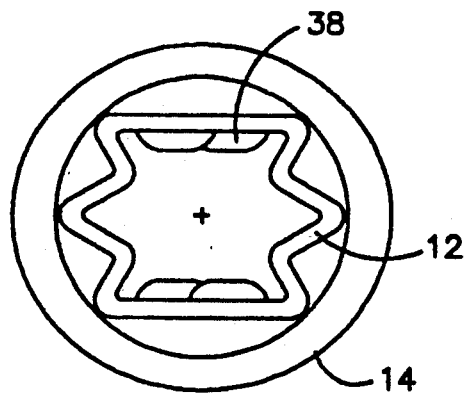
FIG. 14 is a rear elevation view of an uninstalled connector of the type described by an alternate embodiment of the present invention.
Figure 15:
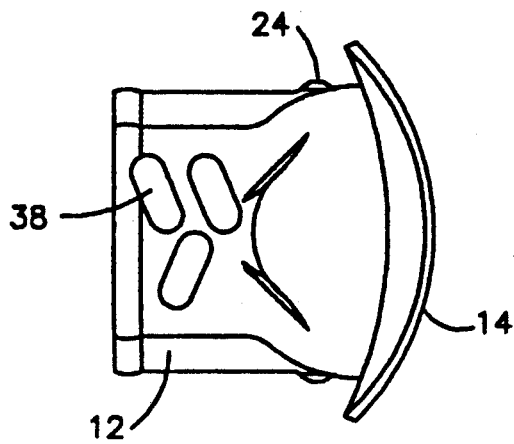
FIG. 15 is a top plan view of an uninstalled connector of the type described by an alternate embodiment of the present invention.
Figure 16:
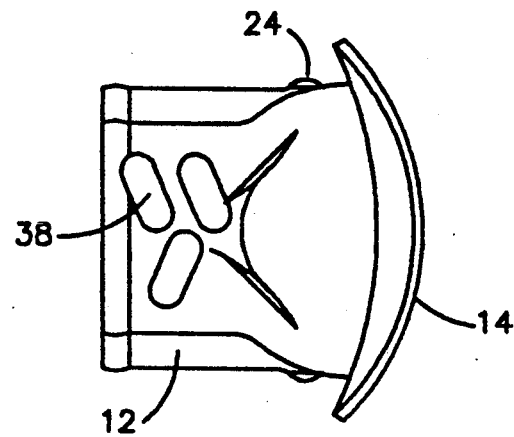
FIG. 16 is a bottom plan view of an uninstalled connector of the type described by an alternate embodiment of the present invention.

FIGS. 12–15 illustrate an alternate embodiment of the connector which replaces the inwardly projecting dimples 16 with inwardly projecting elongated cleats 38. Cleats 38 are arranged in an angular formation on opposing sides of tubular body 12. A typical arrangement of cleats 38 is a chevron pattern, as shown in FIG. 12. Front and rear elevation views of the alternate embodiment with cleats 38 formed in opposing surfaces of tubular body 12 are shown in FIGS. 13 and 14, respectively. FIG. 15 is a top plan view of a connector with cleats 38 and FIG. 16 is a bottom plan view of a connector with cleats 38.

For use in the intended manner, connector 10 is inserted into an opening in an electrical junction box or the like from the inside of said box, with tubular body 12 protruding through the opening to the outside of the box, and compound concave flange 14 abutting against the inside wall immediately surrounding the opening. Outwardly extending dimples 24 provide a slight interference fit of the box wall between flange 14 and dimples 24 as they are passed through the opening and assist in retaining connector 10 within the opening prior to the final crimping of the corrugated end. The abutment of flange 14 against the box wall prevents connector 10 from passing completely through the opening.

Following this procedure, an insulated electrical cable is passed axially through the hollow interior of tubular body 12 and into the interior of the electrical box, extending the desired cable length through connector 10 into the box. Tubular body 12 is then compressed using a pair of pliers or another comparable tool. This operation compresses angular corrugations 18 located along opposing sides 19 of tubular body 12. Central corrugations 26 are forced to extend radially outward of the adjacent defining edge of the electrical box opening, shown in FIG. 8 at 28. Before installation, the distance between the outer ridges of central corrugations 26 is slightly less than the dimension of the intended opening. During installation, this distance expands and becomes greater than the dimension of the opening, constituting an opposing abutment to flange 14, thus securing connector 10 tightly within the opening and preventing it from being forced back into the interior of the electrical junction box.

Figure 7:
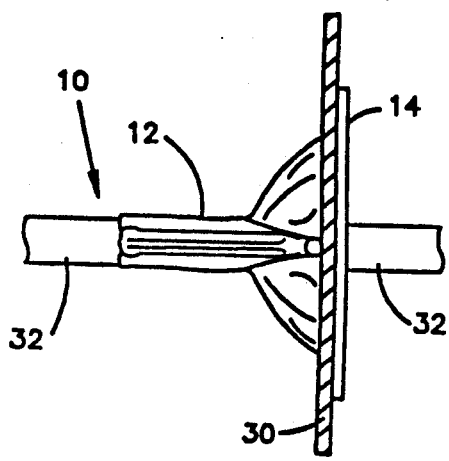
FIG. 7 is a side view of an installed connector of the type described by the present invention.

Deformation of tubular body 12 into its installed form will also cause compound concave flange 14 to be deformed into a flat face, perpendicular to the longitudinal axis of tubular body 12. A fully installed connector 10 is illustrated in FIG. 7. Flange 14 has been deformed into a flat, planar surface of engagement with electrical box wall 30, insuring even distribution of stress introduced to the connector from tensile forces placed upon cable 32, and effectively closing the opening surrounding the connector.

Figure 8:
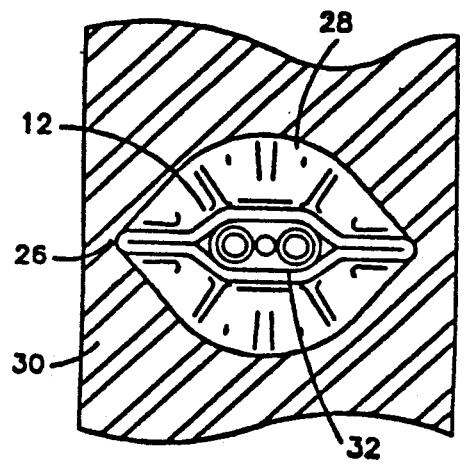
FIG. 8 is a rear view of an installed connector of the type described by the present invention.
Figure 9:
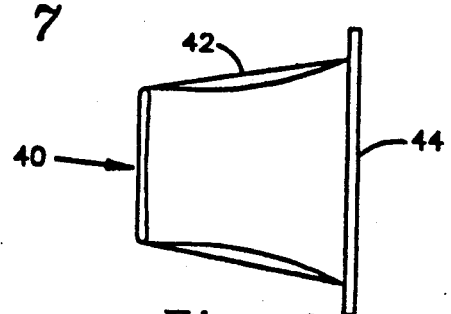
FIG. 9 is a side view of a typical uninstalled connector of the type generally described by the prior art.
Figure 10:
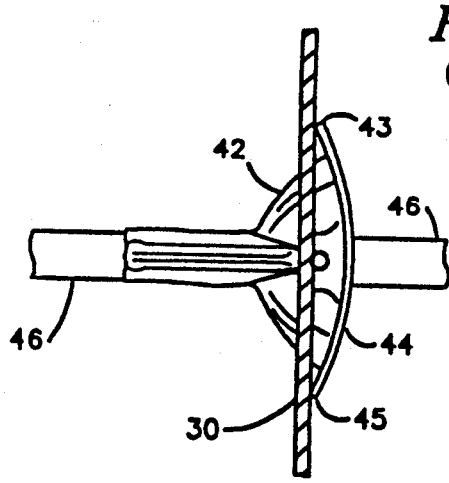
FIG. 10 is a side view of a typical installed connector of the type generally described by the prior art.
Figure 11:
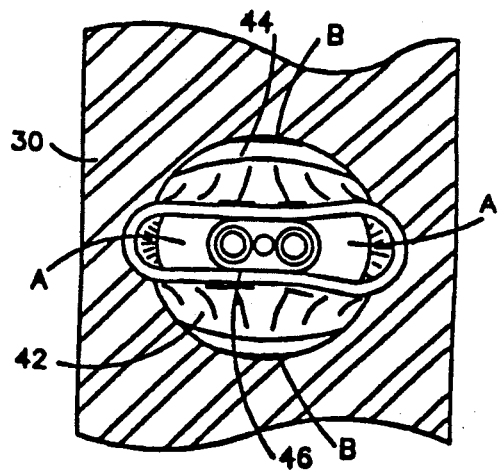
FIG. 11 is a rear view of a typical installed connector of the type generally described by the prior art.

In addition to flattening flange 14, deformation of connector 10 of the present invention will force inwardly projecting angular corrugations 20, of FIGS. 2 and 3, toward each other, thereby effectively surrounding the cable and preventing introduction of foreign objects into the electrical box. FIG. 8, a rear view of compressed tubular body 12, shows the increased closure of tubular body 12 around cable 32. Inwardly projecting dimples 16, or inwardly projecting elongated cleats 38 in the alternate embodiment, enhance the frictional engagement of connector 10 with cable 32 and prevent cable 32 from moving with respect to connector 10.

Whereas the preferred form of the invention has been shown and described herein, it should be realized that there may be many modifications, substitutions and alterations thereto without departing from the scope of the following claims.

The embodiments of the invention in which an exclusive property or privilege is claimed are defined as follows:

1. A cable connector for use with electrical junction boxes and the like, comprising a one-piece hollow tubular body of readily deformable material with a flange at one end, and the other end being insertable into an opening of an electrical junction box or the like such that the flanged end of said connector abuts against the inside wall of the electrical box and the tubular body projects beyond the opposite side of said wall, said tubular body being readily deformable to tightly clamp a cable or conductor and serving as an opposing abutment for the flange when deformed, and said flange being shaped in such a manner that upon deformation of the tubular body the flange will be correspondingly deformed to result in a substantially flat, planar surface of engagement between the flange and electrical box wall.

2. The connector of claim 1 wherein the flange has a compound concave shape.

3. The connector of claim 2 wherein said compound concave shaped flange may be described by arcs swung on two radii, the first radius being swung in a vertical plane with the radius originating at a point forward of the flange, and the second radius being swung in a horizontal plane with the radius originating from a point rearward of the flange, the lengths of said radii being chosen such that the flange will, upon final deformation of the tubular body, arrive at a final shape which has a flat, planar surface of engagement with the electrical box wall.

4. The connector of claim 1 wherein the tubular body is formed with longitudinally extending corrugations in at least one side of said tubular body.

5. The connector of claim 4 wherein the corrugations are formed of three outwardly-projecting, 60-degree angle corrugations and two inwardly-projecting, 90-degree angle corrugations, said corrugations extending from the non-flanged end of the tubular body approximately two-thirds of the way towards the flange, and where compression of said corrugations results in closure of the tubular body around the connector, said closure being adequate to prevent introduction of foreign objects into the connector.

6. The connector of claim 5 wherein the distance between the outer ridges of the central 60-degree angle corrugations of opposing sides is slightly less than the dimension of the intended electrical box opening, such that when compressed said ridges are forced radially outward, and form an opposing abutment to the flange, thereby securing the connector firmly within the opening.

7. The connector of claim 6 further characterized by an outwardly extending dimple located at the edge of the outer ridge of each central 60-degree angle corrugation and a suitable distance behind the flange to allow the thickness of a typical electrical box wall to fit between the dimple and the flange, said dimples providing a slight interference fit for assistance in retaining the connector within the opening prior to final crimping.

8. The connector of claim 1 further characterized by a plurality of inwardly projecting dimples located on at least one of the uncorrugated sides of the tubular body and arranged in configurations that maximize the potential for securing the cable within the connector.

9. The connector of claim 1 further characterized by a plurality of inwardly projecting elongated cleats located on at least one of the uncorrugated sides of the tubular body and arranged in angular formations that maximize the potential for securing the cable within the connector.

10. A cable connector of the type insertable into an opening in an electrical junction or the like and thereafter deformable to engage an inserted electrical cable, the connector comprising:
a hollow, tubular body of readily deformable material having corrugations on at least one side thereof which define a pair of spaced crush zones bounded by a pair of expansion zones in said body; and
an initially non-planar flange attached to said tubular body and extending outwardly therefrom, said flange having first and second portions adjacent said crush zones and initially flared away from said crush zones, and third and fourth portions adjacent said expansion zones and initially flared toward said expansion zones, such that upon deformation of the tubular body all of said flange portions are moved to a generally planar condition.

* * * * *